(12) United States Patent
Kuwayama

(10) Patent No.: US 7,184,087 B2
(45) Date of Patent: Feb. 27, 2007

(54) ON-SCREEN DEVICE FOR SUBJECT OF INTEREST IN PORTABLE ELECTRONIC DEVICE, AND METHOD OF CONTROLLING SAME

(75) Inventor: Akiko Kuwayama, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 773 days.

(21) Appl. No.: 10/144,043

(22) Filed: May 14, 2002

(65) Prior Publication Data

US 2002/0176011 A1    Nov. 28, 2002

(30) Foreign Application Priority Data

May 22, 2001  (JP)  ............................. 2001-151936
May 25, 2001  (JP)  ............................. 2001-156283

(51) Int. Cl.
  *H04N 5/222*  (2006.01)
  *H04N 5/262*  (2006.01)
(52) U.S. Cl. .................................. 348/333.12; 348/239
(58) Field of Classification Search .......... 348/333.12, 348/231.3; 345/667, 660
   See application file for complete search history.

(56) References Cited

U.S. PATENT DOCUMENTS

| | | | | |
|---|---|---|---|---|
| 4,742,553 A | * | 5/1988 | Irwin | .......................... 382/299 |
| 5,844,541 A | * | 12/1998 | Cahill, III | .................... 345/667 |
| 5,914,748 A | * | 6/1999 | Parulski et al. | ............. 348/239 |
| 6,128,406 A | * | 10/2000 | Ostrovsky | .................... 382/166 |
| 6,441,850 B1 | * | 8/2002 | Dotsubo et al. | ............ 348/239 |
| 6,642,935 B1 | * | 11/2003 | Soga | .......................... 345/660 |

\* cited by examiner

*Primary Examiner*—David Ometz
*Assistant Examiner*—Luong T. Nguyen
(74) *Attorney, Agent, or Firm*—Sughrue Mion, PLLC

(57) ABSTRACT

Data representing a bitmap image of 320 pixels horizontally by 480 lines vertically is stored in an SDRAM. The amount of this bitmap image data is adjusted by a data adjustment circuit so as to obtain a bitmap image of 640 pixels horizontally by 480 lines vertically. The image of a subject is sensed by an image sensing device and sensed-image data representing a subject image of 640 pixels horizontally by 480 lines vertically is obtained. The bitmap image data whose amount of data has been adjusted and the sensed-image data are applied to an on-screen processing circuit, which proceeds to execute on-screen processing so as to superimpose the bitmap image on the sensed image. The image that is the result of superimposing the bitmap image on the sensed image is displayed on a display device. In another aspect, the image of a subject is sensed using an image sensing device, whereby YC data is obtained. The YC data is recorded on an SDRAM. The YC data is then read from the SDRAM and converted to bitmap image data in a table RAM. The bitmap image data obtained by the conversion is recorded on the SDRAM. Thus the image of a subject obtained by imaging can be converted to data representing a bitmap image superimposed on the image of the subject.

11 Claims, 9 Drawing Sheets

ON-SCREEN DEVICE FOR SUBJECT OF INTEREST IN PORTABLE ELECTRONIC DEVICE, AND METHOD OF CONTROLLING SAME

BACKGROUND OF THE INVENTION

1. Field of the Invention

This invention relates to an on-screen device for an image of interest in a portable electronic device, and to a method of controlling the on-screen device.

The invention relates further to a digital camera with an on-screen function (inclusive of an arrangement in which a portable electronic device is equipped with a camera function) for generating a composite image by superimposing a bitmap image on the image of a subject.

2. Description of the Related Art

A composite image is obtained by superimposing a template image on the image of a subject in such a manner that the image of a main subject will be positioned in a window formed in the template image (on-screen image). By utilizing the template image, the background or surroundings of the image of the main subject can be decorated in accordance with the preferences of the user.

Such a template image usually is represented by bitmap image data. Since the template image has a size identical with that of one frame of the subject image on which the template image is superimposed, the amount of bitmap image data also is identical with the amount of data in one frame. Consequently, the bitmap image involves a large quantity of data. This means that the memory that stores the bitmap image data must have a large capacity.

DISCLOSURE OF THE INVENTION

An object of the present invention is to so arrange it that bitmap image data capable of being used in on-screen processing can be stored using a memory having a comparatively small capacity, thereby making possible on-screen processing for displaying a bitmap image on the image of a subject.

The conventional practice is to generate a bitmap image in advance. Until now, no thought has been given to using a desired image, which has been captured by a user, as a bitmap image.

Accordingly, another object of the present invention is to so arrange it that the image of a subject captured by a user can be used as a bitmap image.

According to a first aspect of the present invention, there is provided an on-screen device for an image of interest in a portable electronic device, comprising an input device for inputting image-of-interest data representing an image of interest having a prescribed size equivalent to one frame of an image; a reading device for reading on-screen bitmap image data out of a storage medium that stores the on-screen bitmap image data, the on-screen bitmap image data representing an on-screen image, which has an amount of data less than that of reference bitmap image data representing the one frame of the image and which is superimposed on the image of interest represented by the image-of-interest data input from the input device; an adjustment device (adjustment means) for adjusting the amount of data of the on-screen bitmap image data in such a manner that the size of the on-screen image represented by the on-screen bitmap image data read by the reading device will take on the prescribed size equivalent to one frame of the image; and a device (means) for applying on-screen processing to the image-of-interest data and the adjusted on-screen bitmap image data in such a manner that the on-screen image, which is represented by the on-screen bitmap image data adjusted by the adjustment device, will be superimposed on the image of interest represented by the image-of-interest data input from the input device.

The present invention provides also a method of controlling the operation of the on-screen device described above. Specifically, the method includes the steps of: inputting image-of-interest data representing an image of interest having a prescribed size equivalent to one frame of an image; reading on-screen bitmap image data out of a storage medium that stores the on-screen bitmap image data, the on-screen bitmap image data representing an on-screen image, which has an amount of data less than that of reference bitmap image data representing the one frame of the image and which is superimposed on the image of interest represented by the image-of-interest data that has been input; adjusting the amount of data of the on-screen bitmap image data in such a manner that the size of the on-screen image represented by the read on-screen bitmap image data will take on the prescribed size equivalent to one frame of an image; and applying on-screen processing to the image-of-interest data and the adjusted on-screen bitmap image data in such a manner that the on-screen image, which is represented by the adjusted on-screen bitmap image data that has been adjusted, will be superimposed on the image of interest represented by the image-of-interest data that has been input.

In accordance with the first aspect of the present invention, on-screen bitmap image data having an amount of data less than that of reference bitmap image data representing the one frame's worth of an image has been stored on a storage medium. When the on-screen bitmap image data is read from the storage medium, the amount of data of the on-screen bitmap image data is adjusted in such a manner that the size of the on-screen image represented by the on-screen bitmap image data read by the reading device will take on the prescribed size equivalent to one frame of an image. On-screen image processing is executed in such a manner that the on-screen image, which is represented by the on-screen bitmap image data the amount of which has been adjusted, will be superimposed on the image of interest represented by the entered image-of-interest data.

In accordance with the first aspect of the present invention, the amount of on-screen bitmap image data is adjusted. As a result, on-screen processing for displaying a bitmap image on an image of interest becomes possible even if the amount of on-screen bitmap image data that has been stored on the storage medium is less than the amount of reference bitmap image data representing one frame's worth of an image. This is advantageous in that a storage medium of small capacity can be utilized.

In a case where the format of the image of interest represented by the image-of-interest data is based upon the PAL (phase alternation by line) color television system and, moreover, the format of the on-screen image represented by the on-screen bitmap image data that has been stored on the storage medium is an image format based upon the NTSC (National Television System Committee), the amount of on-screen bitmap image data would be adjusted in such a manner that the size of the on-screen image represented by the on-screen bitmap image data read by the reading device takes on the size of the image based upon the PAL system.

Thus, even if the on-screen image format represented by the on-screen bitmap image data is an image format based upon the NTSC system, on-screen bitmap image data having an image format based upon the PAL system can be obtained. It is not necessary to prepare on-screen bitmap image data having the format of the PAL system and on-screen bitmap image data having the format of the NTSC system.

According to a second aspect of the present invention, there is provided a digital camera with an on-screen function, comprising: an image sensing device for sensing the images of different subjects and successively outputting subject image data representing two frames of the subject images; a first recording controller (first recording control means) for storing, on a recording medium, the subject image data representing the two frames of the subject images output from the image sensing device; a first converter (first conversion means) for converting the subject image data representing one subject image, from the subject image data representing the two frames of the subject images stored on the recording medium, to bitmap image data representing a bitmap image, which is to be superimposed on the other subject image, and having attached control data that indicates transparency of this bitmap image; a composite-image generating device (superimposed-image generating means) for generating a composite image, which is obtained by superimposing the bitmap image on the other subject image at the transparency indicated by the control data; and an output device for outputting data representing the composite image that has been generated by the composite-image generating device.

The present invention provides also a method of controlling the operation of the digital camera equipped with the on-screen function described above. Specifically, the method includes the steps of: sensing the images of different subjects and successively obtaining subject image data representing two frames of the subject images; storing, on a recording medium, the subject image data representing the two frames of the subject images that have been obtained; converting the subject image data representing one subject image, from the subject image data representing the two frames of the subject images stored on the recording medium, to bitmap image data representing a bitmap image, which is to be superimposed on the other subject image, and having attached control data that indicates transparency of this bitmap image; generating a composite image, which is obtained by superimposing the bitmap image on the other subject image at the transparency indicated by the control data; and outputting data representing the composite image that has been generated.

In accordance with the present invention, the images of different subjects are sensed and subject image data representing the two frames of the subject images is obtained. More specifically, imaging would be performed twice using one image sensing device. The subject image data representing the two frames of the subject images obtained is stored on a recording medium. Of the subject image data representing the two frames recorded on the recording medium, the subject image data representing one of the subject images is converted to bitmap image data. The bitmap image data obtained by the conversion is superimposed on the other subject image at the indicated transparency. Data representing the composite image is output (e.g., delivered as an external output or displayed on a display device, etc.).

Data representing the image of a subject that the user obtains by capturing the image of the subject can be converted to bitmap image data to be superimposed on the image. The image of a desired subject can be used as the bitmap image.

The digital camera may further comprise an out-of-focus area extraction device (out-of-focus area extraction means) for extracting an area in which the other image is not in focus. In this case, it is preferred that the composite-image generating device generate a composite image in which the bitmap image is superimposed on the area extracted by the out-of-focus area extraction device.

Thus, the bitmap image is superimposed on an area of the subject image that is out of focus. Since the bitmap image is not superimposed on an in-focus area (or since the transparency is 100%), the in-focus area of the composite image becomes easier to see.

The digital camera may further comprise a second converter (second conversion means) for re-converting bitmap image data, which has been obtained by the conversion performed by the first converter, to subject image data representing the one subject image.

Since subject image data is obtained, a variety of developments become feasible using this subject image data even if the device is one that cannot display a bitmap image.

The digital camera may further comprise a second recording-medium control device (second recording-medium control means) for recording, on the recording medium, bitmap image data, which has been obtained by the conversion performed by the first converter, and control data.

The digital camera may further comprise a reading device for reading bitmap image data that has been recorded on the recording medium; two line memories capable of writing the bitmap image data, which has been read by the reading device, alternately one line of the bitmap image data at a time, and of alternately outputting the bitmap image data that has been written; a switching circuit for performing switching in such a manner that the two line memories are cascade connected; and a weighting circuit (weighting means) for weighting the one line of bitmap image data that has been read by the reading device and bitmap image data output from each of the line memories of the two cascade-connected line memories.

Files having various characteristics can be constructed by changing weighting coefficients of the weighting circuit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of a digital camera embodying the present invention will now be described in detail with reference to the drawings.

Figure 1:
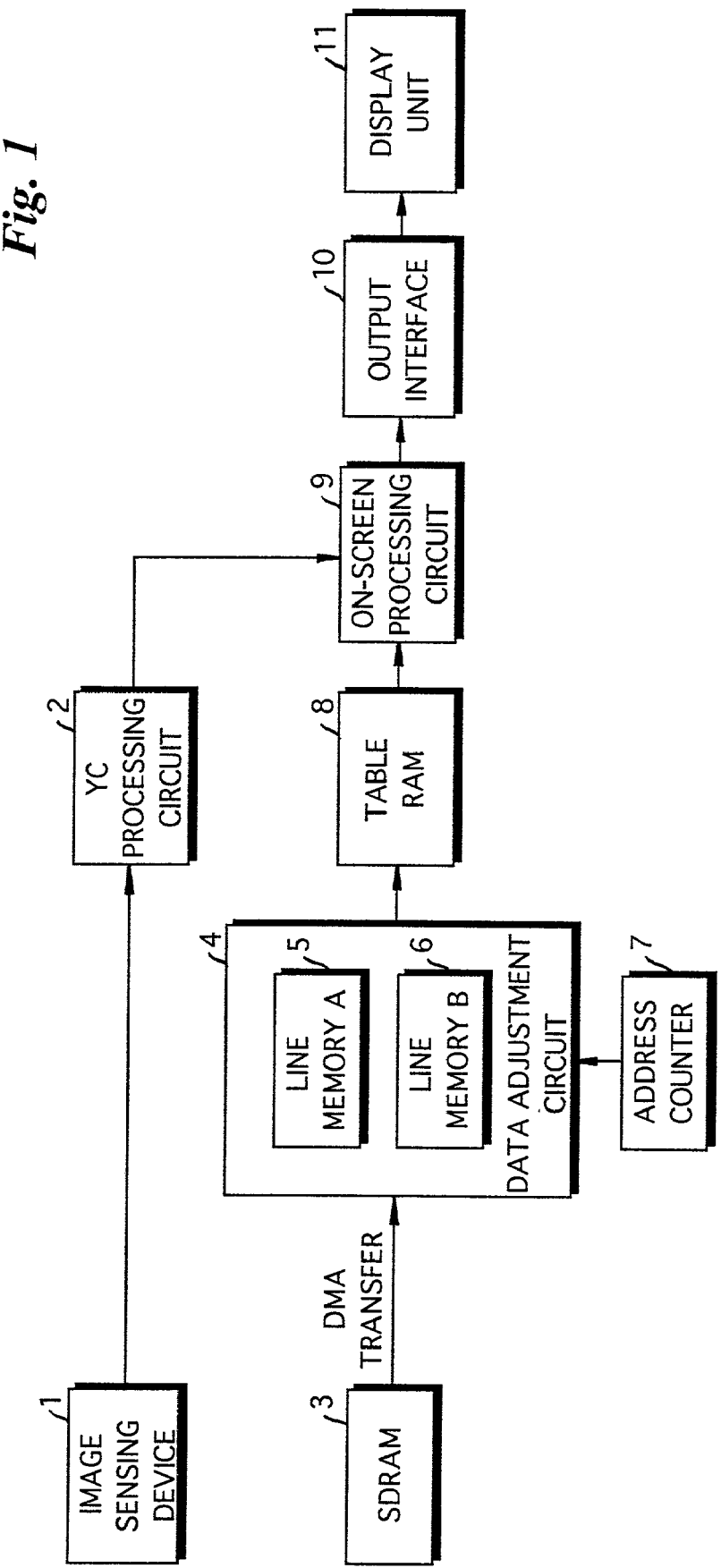
FIG. 1 is a block diagram illustrating part of the electrical structure of a digital still camera according to an embodiment of the present invention.

FIG. 1 is a block diagram illustrating part of the electrical structure of a digital still camera (portable electronic device) illustrative of an embodiment of the present invention.

The digital still camera according to this embodiment superimposes a bitmap image (by on-screen processing), which is represented by bitmap image data, on a sensed image represented by sensed-image data obtained by image sensing, and displays the resultant image on the display screen of a display unit 11.

The digital still camera is provided with the display unit 11, which has a display screen the display area of which is based upon a VGA (video graphics array) (640 pixels horizontally by 480 lines vertically).

By sensing the image of a subject using an image sensing unit 1 such as a solid-state image sensing device, RGB sensed-image data representing the subject image is obtained. The sensed-image data represents a sensed image of 640 pixels horizontally by 480 lines vertically. This data is converted to luminance data Y and to R-Y, B-Y color difference data by a YC processing circuit 2. The luminance data Y and R-Y, B-Y color difference data obtained by the conversion is input to an on-screen processing circuit 9.

Bitmap image data representing a bitmap image of 320 pixels horizontally by 480 lines vertically (the amount of this data is less than that of bitmap image data in accordance with the NTSC standard, namely 640 pixels horizontally by 480 lines vertically) is stored in an SDRAM (synchronous dynamic random-access memory). Also stored in the SDRAM, in correspondence with the bitmap image data, is control data indicating the degree of transparency at which the bitmap image is superimposed on the sensed image. The bitmap image data that has been stored in the SDRAM is read out by a DMA (direct memory access) controller (not shown) and is applied to a data adjustment circuit 4.

The data adjustment circuit 4 includes a first line memory 5 and a second line memory 6 for temporarily storing one line of bitmap image data and the corresponding control data. A write-address signal and a read-address signal from an address counter 7 are applied to the data adjustment circuit 4. By applying the write-address signal, which is output from the address counter 7, to the data adjustment circuit 4, one line of image data and the control data corresponding to this image data is written alternately to the first line memory 5 and second line memory 6.

Figure 2:
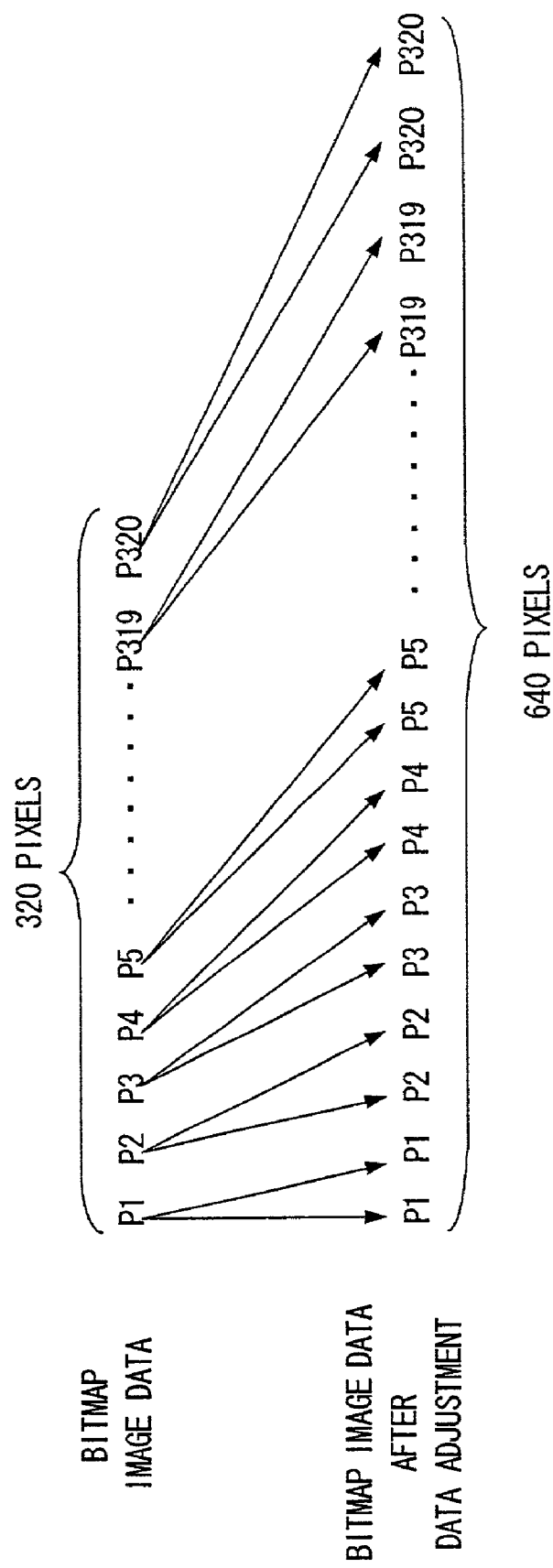
FIG. 2 illustrates how data is adjusted.

When image data that has been written to the data adjustment circuit 4 is read, the read-address signal is supplied from the address counter 7 to the data adjustment circuit 4 in such a manner that pixels are repeated twice in the horizontal direction, as illustrated in FIG. 2. As a result, the amount of data in one line of image data increases from 320 pixels (P1 to P320) to 640 pixels [(P1 to P320)×2] (this is interpolation processing).

The bitmap image data, which has undergone the data adjustment, output from the data adjustment circuit 4 is converted to luminance data Y and color difference data R-Y, B-Y in a table RAM 8. For example, the bitmap image data after the data adjustment would indicate an address in the table RAM 8, and the luminance data Y and color difference data R-Y, B-Y that has been stored at this address would be read out of the table RAM 8. The luminance data Y and color difference data R-Y, B-Y output from the table RAM 8 is input to the on-screen processing circuit 9. Further, the control data that has been stored in the SDRAM 3 also is input to the on-screen processing circuit 9 via the data adjustment circuit 4 and table RAM 8.

The on-screen processing circuit 9 executes on-screen processing in such a manner that the bitmap image will be superimposed upon the image of the subject at a transparency specified by the control data. Composite sensed-image data representing the sensed image on which the bitmap image has been superimposed is displayed on the display screen of the display unit 11 via an output interface 10.

Thus an image in which a bitmap image has been superimposed on the image of a subject can be generated merely by storing 320 pixels horizontally by 480 lines vertically of bitmap image data, which is less data than 640 pixels horizontally by 480 lines vertically of bitmap image data. This means that the SDRAM 3 used can be of smaller capacity.

Figure 3:
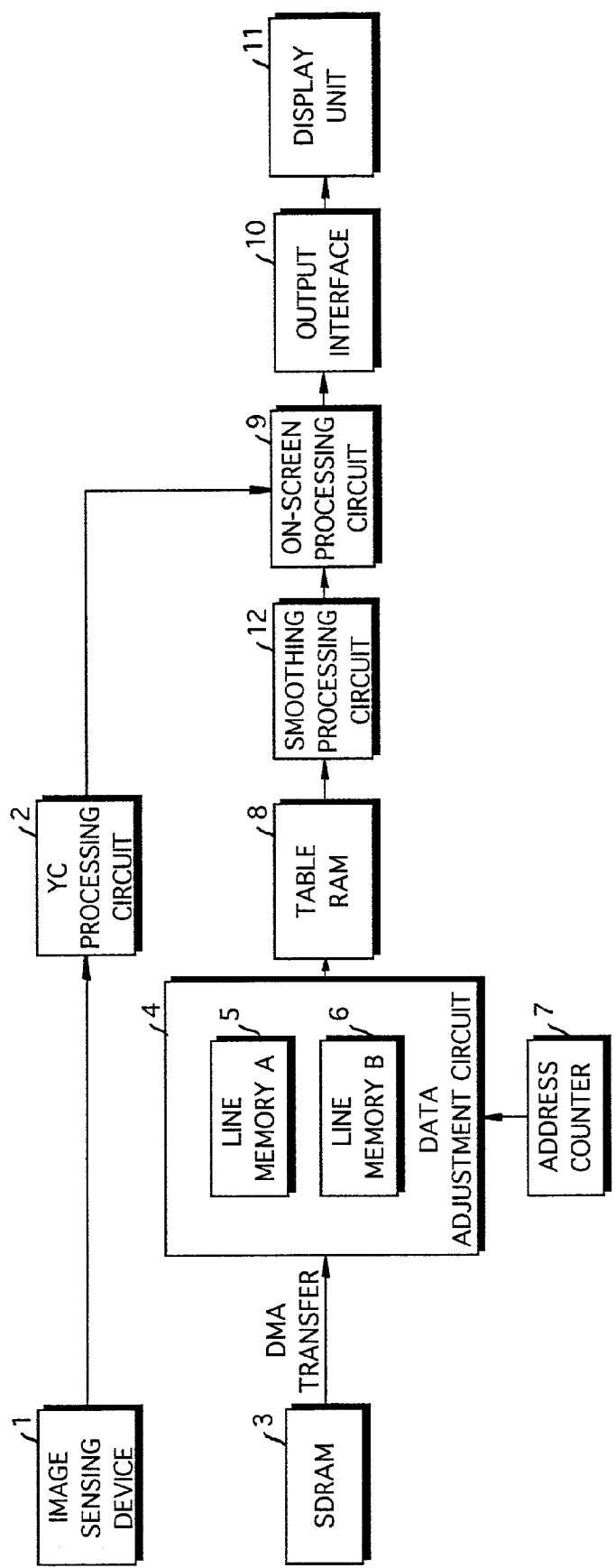
FIG. 3 is a block diagram illustrating part of the electrical structure of a digital still camera according to another embodiment of the present invention.

FIG. 3 is a block diagram illustrating part of the electrical structure of a digital still camera (portable electronic device) illustrative of another embodiment of the present invention. Components in FIG. 3 identical with those shown in FIG. 1 are designated by like reference characters and need not be described again.

In the digital still camera according to this embodiment, a circuit 12 is provided for subjecting bitmap image data, which has been output from the table RAM 8, to smoothing processing. The smoothing processing circuit 12 smoothes jaggies at the edges of the image generated by the data adjustment described above.

Figure 4:
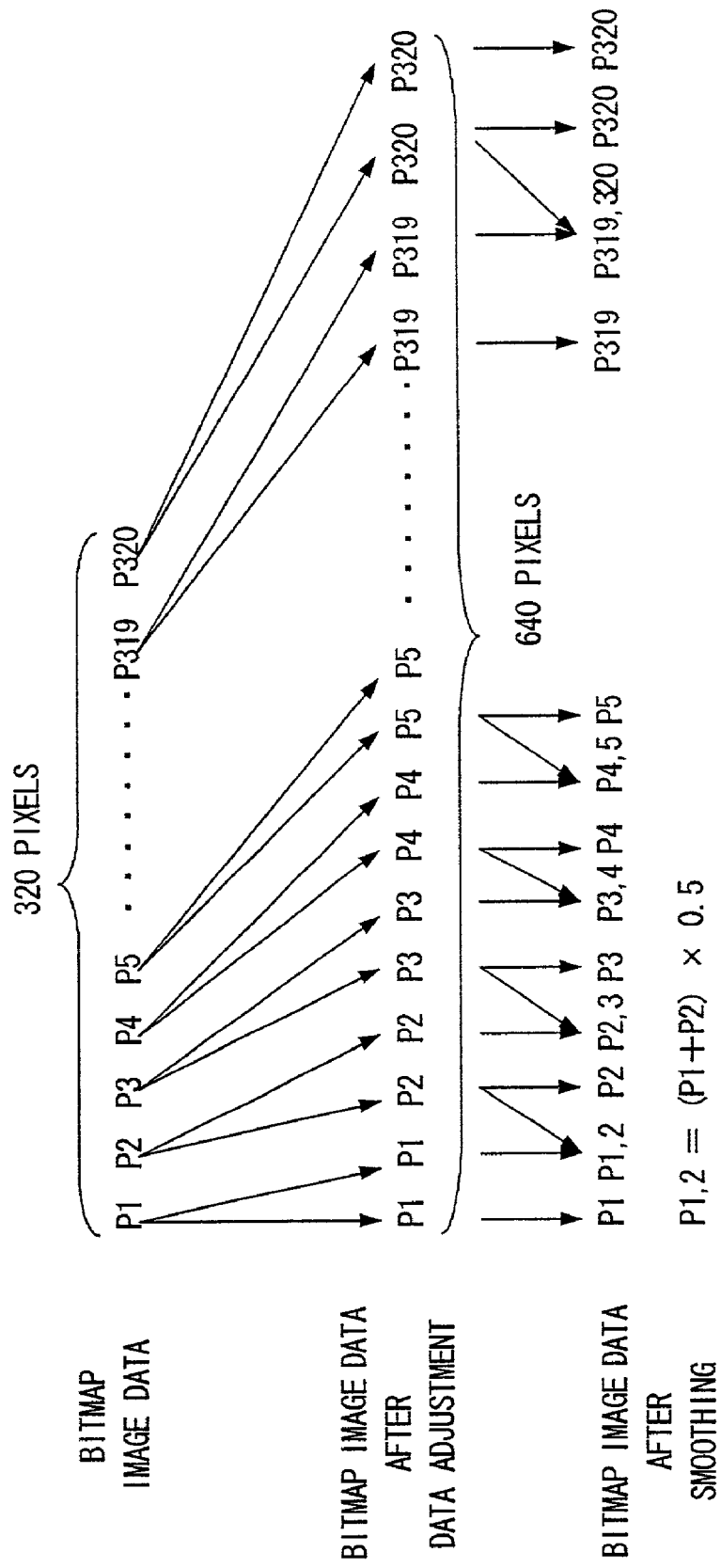
FIG. 4 illustrates smoothing processing.

In FIG. 4, when the bitmap image data is read from the data adjustment circuit 4 by repeating the same pixels twice in the manner described above, the smoothing processing circuit 12 takes the arithmetic mean of the image data read the second time in the image data that was read out repeatedly two times and the image data that was read out next. The data obtained by calculating the arithmetic mean is output as image data read out the second time. For example, the first pixel and the second pixel output from the data adjustment circuit 4 are both P1 because the first pixel P1 is read out of the data adjustment circuit 4 repeatedly two times. The third pixel output from the data adjustment circuit 4 is P2. With regard to the image data representing the first pixel, the smoothing processing circuit 12 outputs this as is. However, the image data representing the second pixel becomes pixel P1, 2=(P1+P2)×0.5, which is the arithmetic mean of pixel P1 and pixel P2. The bitmap image obtained by this smoothing processing is smoothed.

The bitmap image data output from the smoothing processing circuit 12 is applied to the on-screen processing circuit 9, which executes on-screen processing in the manner described above.

In the above-described embodiment, smoothing processing is executed after one line's worth of data is doubled in the data adjustment circuit 4. However, an arrangement may be adopted in which, rather than applying smoothing processing after the amount of data is doubled, the amount of data is doubled while the bitmap image data output from the SDRAM 3 is subjected to smoothing processing.

Figure 5:
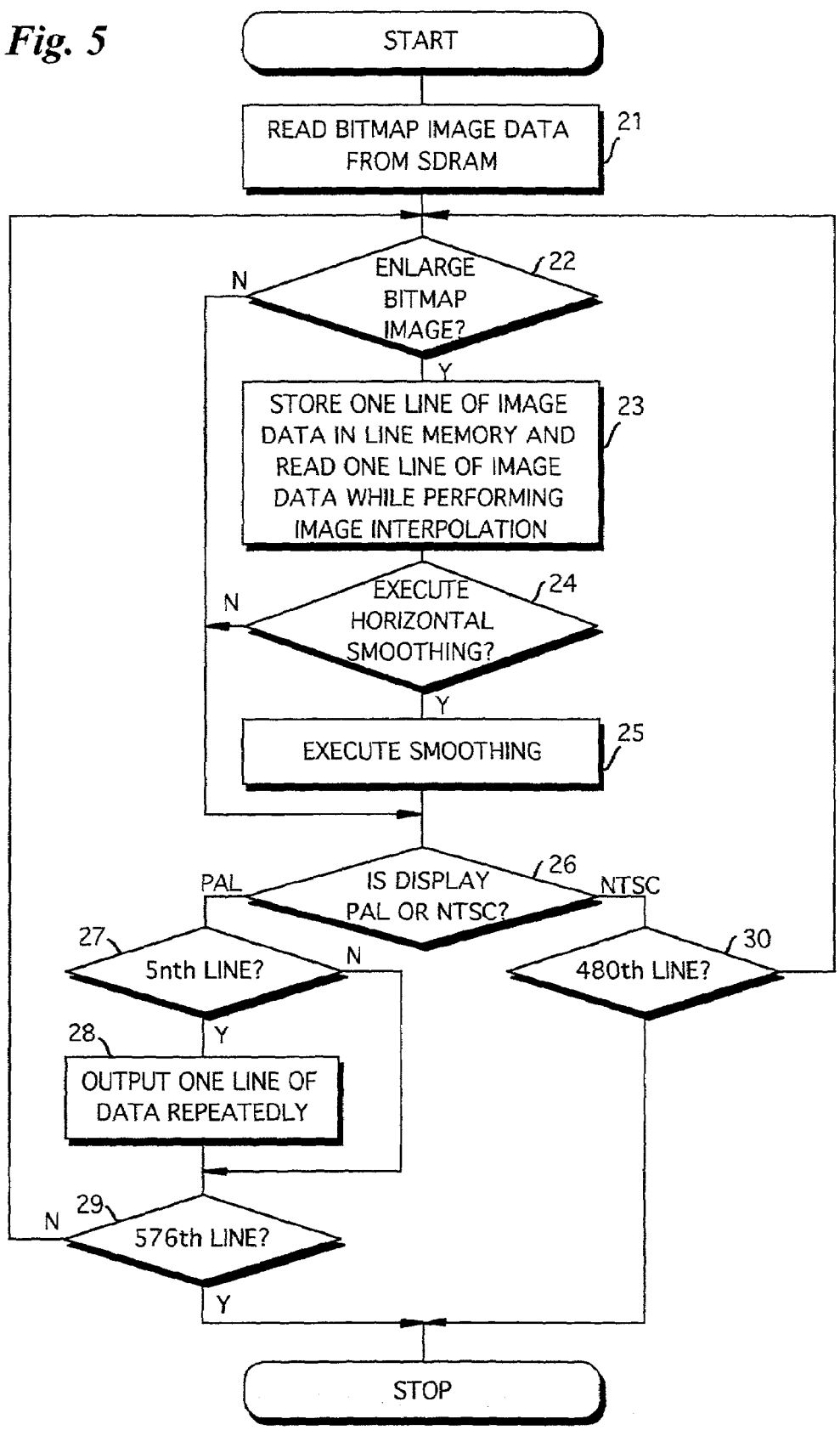
FIG. 5 is a flowchart illustrating processing for adjusting the amount of bitmap image data.

FIG. 5 is a flowchart illustrating processing for adjusting the amount of bitmap image data to the amount of sensed-image data.

Bitmap image data that has been stored in the SDRAM 3 is read (step 21). It is assumed that this bitmap image data represents a bitmap image of 320 pixels horizontally by 480 lines vertically. In a case where the bitmap image represented by the read bitmap image data is to be enlarged in the manner described above ("YES" at step 22), the data is stored in the line memory 5 or 6 of the data adjustment circuit 4. Pixel interpolation is then carried out while reading the bitmap image data from the data adjustment circuit 4 in the manner described above. (step 23). Of course, an arrangement may adopted in which pixel interpolation is performed when the bitmap image data is stored in the line memory 5 or 6.

In a case where smoothing processing in the horizontal direction is executed ("YES" at step 24), smoothing processing is executed in the manner described above (step 25).

Next, it is determined whether display is in accordance with the PAL system or NTSC system (step 26). If the display is in accordance with the PAL system, the number of lines in the vertical direction will be inadequate in the bitmap image displayed by the bitmap image data stored in the SDRAM 3. Interpolation processing is therefore executed in the vertical direction as well. The number of lines in the vertical direction in a PAL image is 576 and the number of lines in the vertical direction in an NTSC image is 480 lines. Thus the number of lines in the vertical direction of a PAL is image 6/5 that in the vertical direction of an NTSC image. This means that one line of image data is read from the data adjustment circuit 4 repeatedly (step 28) every 5n (an n is natural number) lines ("YES" at step 27). The processing of steps 22 to 28 is repeated up to the $576^{th}$ line (step 29). If the display is in accordance with the NTSC system, no vertical interpolation is necessary. The processing of steps 22 to 26 is repeated up to the $480^{th}$ line (step 29).

In the embodiment described above, interpolation processing is executed so as to double the number of pixels in the horizontal direction. However, the present invention is not limited to a doubling of the number of pixels.

Figure 6:
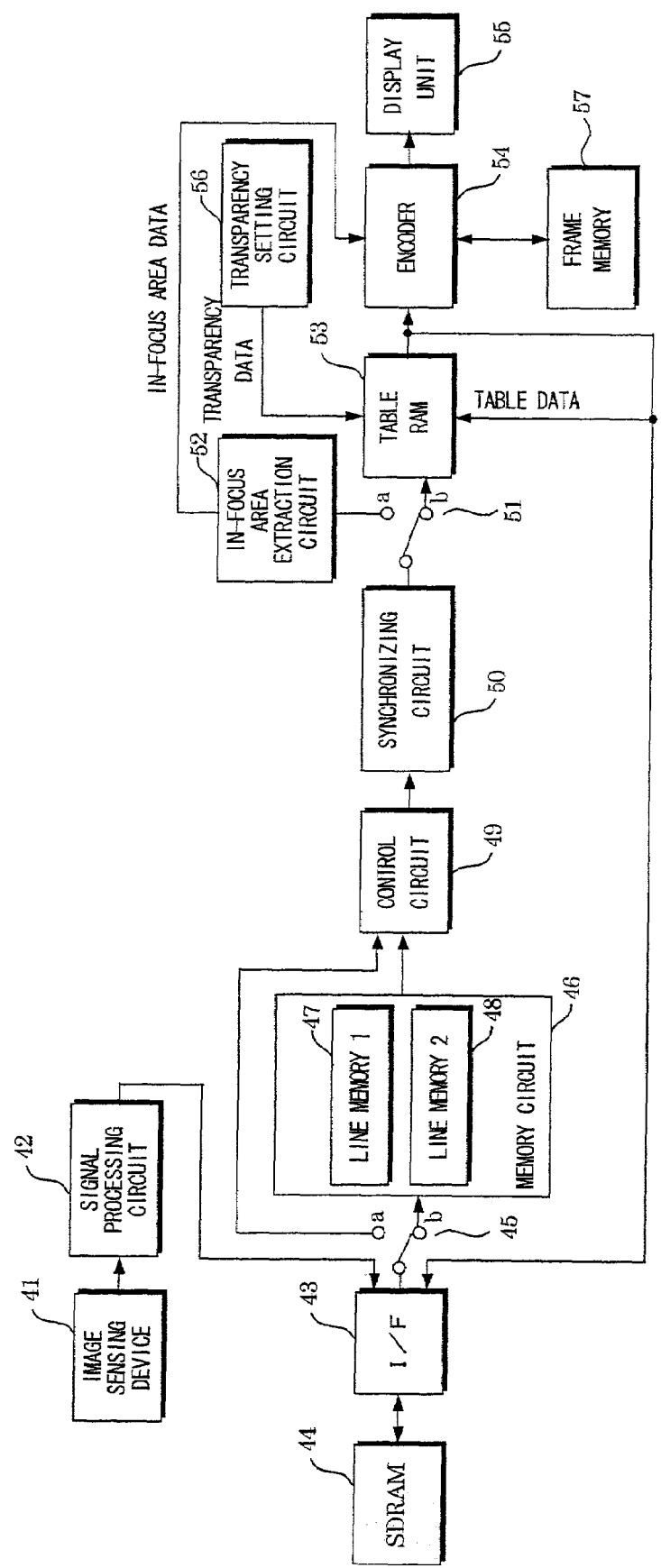
FIG. 6 is a block diagram illustrating part of the electrical structure of a digital still camera according to still another embodiment of the present invention.

FIG. 6 is a block diagram illustrating part of the electrical structure of a digital still camera illustrative of still another embodiment of the present invention.

A digital still camera according to this embodiment is such that YC data (data representing the image of a subject) obtained by sensing the image of a subject can be converted to data representing a bitmap image capable of being superimposed on the image of the subject at a desired degree of transparency.

The image of a subject is sensed by an image sensing unit 41 to obtain image data representing the image of the subject. A signal processing circuit 42 subjects the image data to predetermined signal processing such as a gamma correction and white balance adjustment and processing for generating luminance data Y and color difference data B-Y, R-Y (referred to as YC data below).

The YC data output from the signal processing circuit 42 is applied to and recorded on an SDRAM card 44 that has been inserted into the digital still camera via an interface 43. It may be so arranged that the YC data is recorded not on an SDRAM card removably inserted into the digital still camera but in a semiconductor memory that is built in the digital still camera.

Conversion-table data for converting YC data to bitmap image data (inclusive of control data representing transparency) and for converting bitmap image data to YC data has been recorded in the SDRAM card 44. The conversion-table data that has been recorded on the data adjustment circuit 4 is read out and applied to a table RAM 53 via the interface 43. The conversion-table data is thus recorded on the SDRAM card 44.

When an image represented by the YC data that has been recorded on the SDRAM card 44 is displayed on the display screen of a display unit 55, a changeover switch 45 is connected to a terminal a. The YC data that has been recorded on the SDRAM card 44 is read out and input to a control circuit 49 via the interface 43 and changeover switch 45. The YC data is output from the control circuit 49 and is input to an encoder 54 upon simply passing through a synchronizing circuit 50, changeover switch 51 and the table RAM 53. The encoder 54 converts the YC data to an NTSC video signal. The NTSC video signal obtained by the conversion is applied to the display unit 55. Thus the subject image represented by the YC data is displayed on the display screen of the display unit 55.

When the YC data that has been recorded on the SDRAM card 44 is to be converted to bitmap image data, the changeover switches 45 and 51 are each connected to respective b terminals thereof. Further, by using a transparency setting circuit 56, the user sets the degree of transparency of the bitmap image to be superimposed on the image of the subject. Data indicating the set transparency is applied to the table RAM 53.

The YC data is read from the SDRAM card 44 and is input to a memory circuit 46 via the interface 43 and changeover switch 45. The memory circuit 46 includes two line memories 47 and 48. YC data representing one line's worth of subject image represented by the YC data is written alternately to the two line memories 47 and 48. The YC data that has been written to the two line memories 47 and 48 is read out of the two line memories 47 and 48 alternately one line at a time and is applied to the control circuit 49.

The YC data is converted to prescribed address data by the synchronizing circuit 50. The address data obtained by the conversion is applied to the table RAM 53 via the changeover switch 51. Bitmap image data corresponding to the address represented by the address data is read from the conversion-table data (i.e., a conversion of bitmap image data is achieved). The transparency data set by the transparency setting unit 56 also is converted from YC data to bitmap image data in the table RAM 53 so as to be incorporated in the bitmap image data. The bitmap image data obtained by the conversion is recorded on the SDRAM card 44 via the interface 43. Thus, YC data obtained by imaging can be converted to bitmap image data and the bitmap image data obtained by the conversion can be recorded on the SDRAM card 44.

Further, in the digital still camera according to this embodiment, the bitmap image data thus generated can be restored to YC data.

When bitmap image data is restored to YC data, the changeover switches 45 and 51 are both connected to their respective b terminals. The bitmap image data is read from the SDRAM card 44 and is written alternately to the two line memories 47 and 48 of the memory circuit 46 via the interface 43 and changeover switch 45. The bitmap image data is read from the two line memories 47 and 48 alternately and is input to the synchronizing circuit 50 via the control circuit 49. The synchronizing circuit 50 converts the bitmap image data to address data. The address data output from the synchronizing circuit 50 is input to the table RAM 53 via the changeover switch 51. The YC data that has been stored at the address designated by the address data is read from the conversion table in the table RAM 53. By applying the YC data to the display unit 55, as described above, the image of the subject represented by this YC data can also be displayed. By applying the YC data to the SDRAM card 44, the data can be recorded on the card.

In a case where a bitmap image represented by bitmap image data is superimposed on the image of a subject represented by the YC data, the changeover switch 45 is connected to the a terminal thereof and the changeover switch 51 is connected to the b terminal thereof. As described above, the YC data is read out of the SDRAM card 44 and applied to a frame memory 57 via the interface 43, the changeover switch 45, the control circuit 49, the synchronizing circuit 50, the changeover switch 51, the table RAM 53 and the encoder 54, whereby the YC data is stored temporarily in the frame memory 57.

Further, the bitmap image data is read out of the SDRAM card 44 and is input to the encoder 54 via the interface 43, the changeover switch 45, the control circuit 49, the synchronizing circuit 50, the changeover switch 51 and the table RAM 53. The encoder 54 superimposes the bitmap image represented by the bitmap image data on the image of the subject represented by the YC data at the degree of transparency represented by the control data contained in the bitmap image data. The image data representing the composite image is applied to the display unit 55. Thus, an image that is the result of superimposing the bitmap image on the image of the subject is displayed on the display screen of the display unit 55.

An in-focus area of the image of an subject can be detected and a bitmap image can be superimposed on the detected in-focus area. In such case the changeover switches 45 and 51 are both connected to their respective a terminals. The YC data is read out of the SDRAM card 44 and is input to an in-focus extraction circuit 52 via the interface 43, the changeover switch 45, the control circuit 49, the synchronizing circuit 50 and the changeover switch 51. The in-focus extraction circuit 52 extracts the spatial frequency of the image of the subject represented by the entered YC data. The part of the image where the spatial frequency is low is the in-focus area and the part where the spatial frequency is high is an out-of-focus area.

The data representing the in-focus area is supplied from the in-focus extraction circuit 52 to the encoder 54. The encoder 54 executes the above-described superimposing processing in such a manner that transparency will be 100% in the in-focus area (the bitmap image is transparent and need not be superimposed) and 0% in the out-of-focus area.

Further, a terminal may be provided for externally outputting data that is output from the table RAM 53.

Figure 7A:
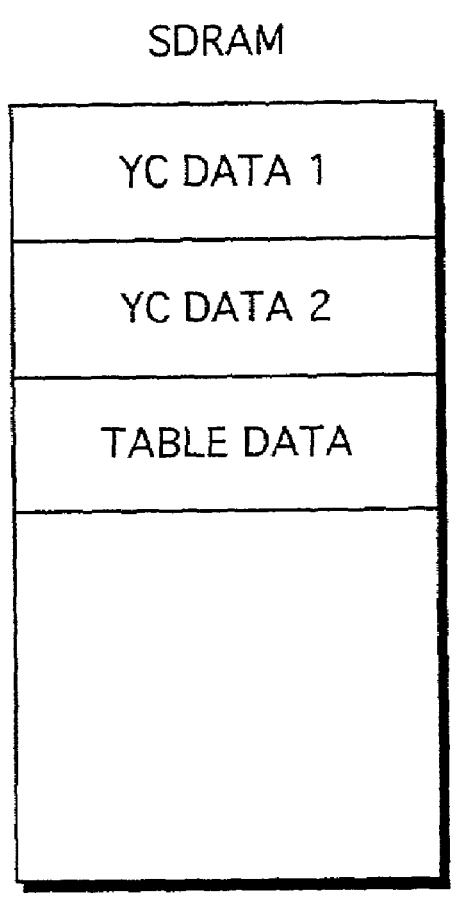
FIGS. 7a and 7b illustrate the data structure of an SDRAM.
Figure 7B:
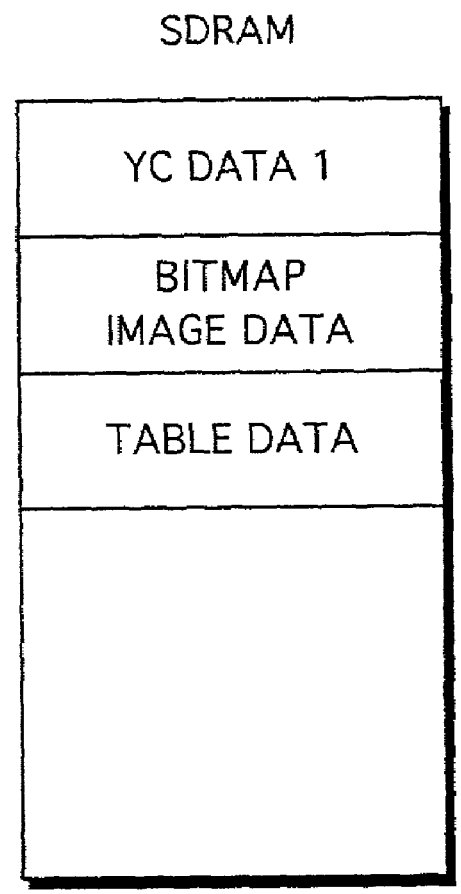

FIGS. 7a and 7b illustrate the data structure (file structure) of the SDRAM card 44.

As mentioned above, the conversion-table data has been recorded on the SDRAM card 44. Further, the YC data is recorded on the SDRAM card 44 by sensing the image of a subject using the image sensing unit 41, as mentioned above. By sensing the image of the subject twice, as shown in FIG. 7a, first YC data and second YC data representing two frames of the image of the subject are recorded on the SDRAM card 44.

For example, the second YC data 2 is read out of the SDRAM card 44 and converted to bitmap image data, and the bitmap image data obtained by the conversion is recorded on the SDRAM card 44 again. The second YC data 2 obtained by sensing the image of the subject is converted to bitmap image data and this data is record on the SDRAM card 44, as shown in FIG. 7b. With the first YC data 1 and bitmap image data having been recorded on the SDRAM card 44, as shown in FIG. 7b, the bitmap image data is restored to YC data, whereby the first YC data 1 and second YC data 2 is recorded on the SDRAM card 44, as depicted in FIG. 7a.

Of course, it may be so arranged that rather than erasing the second YC data 2 from the SDRAM card 44 and then recording the bitmap image data, the bitmap image data is recorded on the SDRAM card 44 while leaving the second YC data 2 on the SDRAM card 44.

Figure 8:
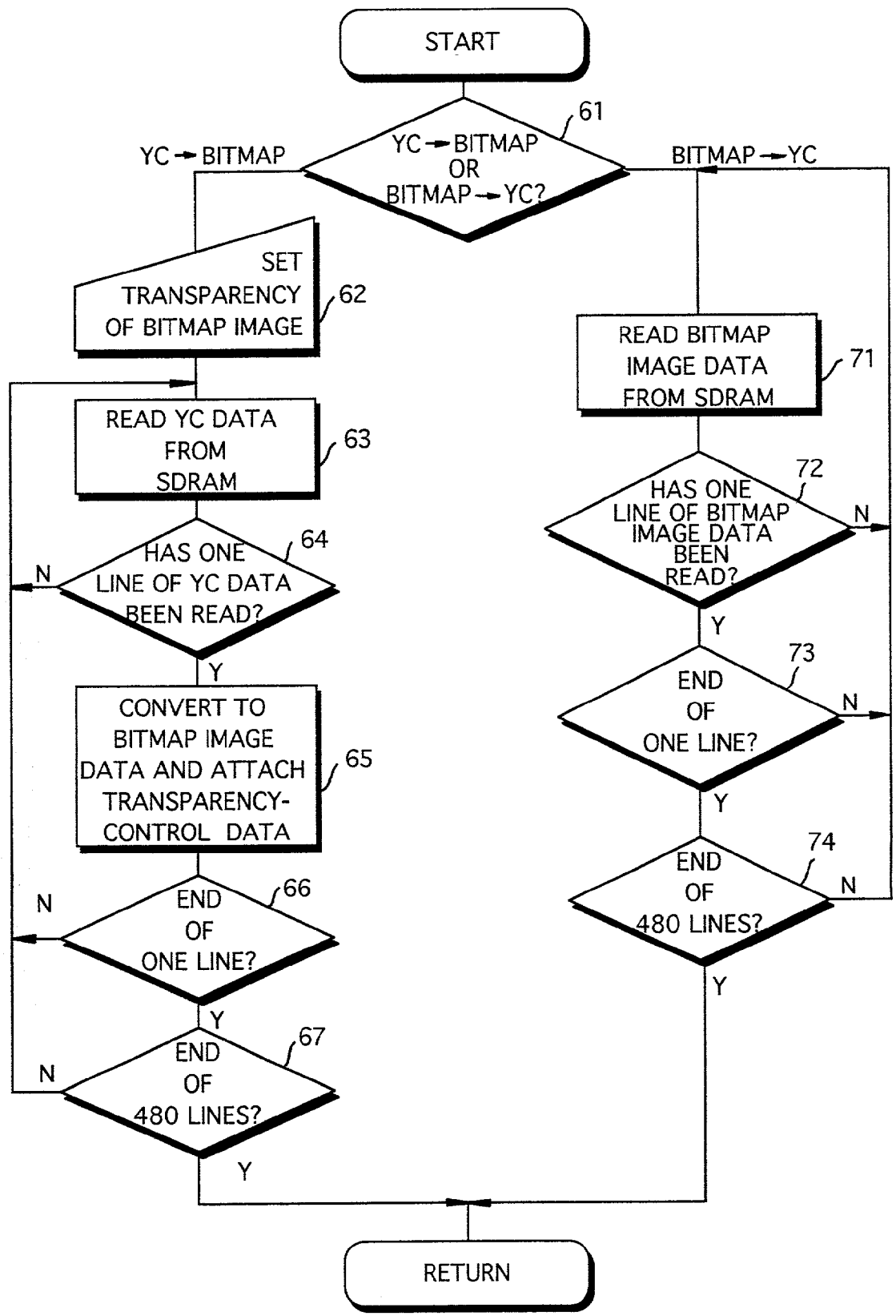
FIG. 8 is a flowchart illustrating processing executed by the digital still camera.

FIG. 8 is a flowchart illustrating processing executed by the digital still camera for effecting a conversion to bitmap image data or to YC data.

When YC data is converted to bitmap image data (step 61), transparency is set by the transparency setting circuit 56 (step 62.) One line of YC data is read from the SDRAM card 44 (step 63; "YES" at step 64).

As described above, a conversion is made to bitmap image data in the table RAM 53 and control data representing the degree of transparency is attached (step 65). The processing of steps 63 to 65 is repeated until one line of YC data ends (step 66). The above-described processing is repeated up to the $480^{th}$ line. When 480 lines have been processed, processing for converting the YC data to bitmap image data ends (step 67).

When bitmap image data is to be converted to YC data (step 61), one line of bitmap image data is read out of the SDRAM card 44 (step 71; "YES" at step 72).

The processing of steps 71 and 72 is repeated until one line of the bitmap image data ends (step 73). The above-described processing is repeated up to the $480^{th}$ line. When 480 lines have been processed, processing for converting the bitmap image data to YC data ends (step 74).

Figure 9:
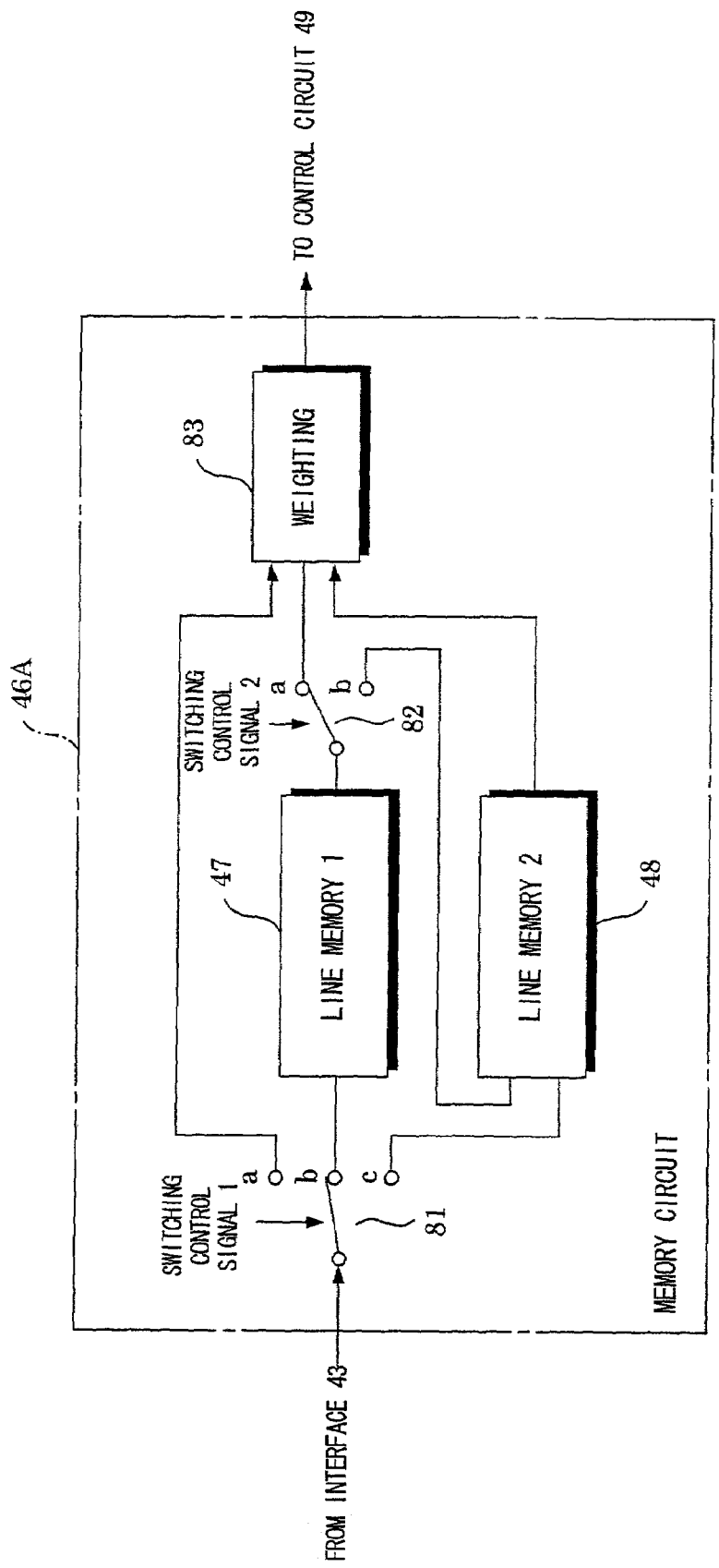
FIG. 9 is a diagram illustrating the electrical structure of a memory circuit.

FIG. 9 illustrates an example of a memory circuit 46A.

The memory circuit 46A is one that is capable of constructing a filter. Though this memory circuit is utilized when YC data or bitmap image data is read from the SDRAM card 44, it can be so arranged that the memory circuit constructs a filter. As a result, high- and low-frequency components of the bitmap image data can be removed.

When the memory circuit 46A is used as a filter circuit, changeover switches 81 and 82 are both connected to respective b terminals thereof. One line of image data (which may be either bitmap image data or YC data) is input to the first line memory 47. When the next line of image data enters the memory circuit 46A, this data is stored in the first line memory 47. The image data that has been stored in the first line memory 47 is input to the second line memory 48. When the next line of image data enters the memory circuit 46A, the changeover switches 81 and 82 are both connected to respective a terminals thereof.

Three lines of image data, namely one line of image data input to the memory circuit 46A, one line of image data output from the first line memory 7 and one line of image data output from the second line memory 48, enter a weighting circuit 83. The latter multiplies the three lines of image data by prescribed weighting coefficients, thereby performing filtering.

In a situation where the memory circuit 46A is not used as a filter, it goes without saying that the changeover switch 81 is switched between b and c terminals and the changeover switch 82 between a and b terminals.

As many apparently widely different embodiments of the present invention can be made without departing from the spirit and scope thereof, it is to be understood that the invention is not limited to the specific embodiments thereof except as defined in the appended claims.

What is claimed is:

1. An on-screen device for an image of interest in a portable electronic device, comprising:
    an input device for inputting image-of-interest data representing an image of interest having a prescribed size equivalent to one frame of an image;

a reading device for reading on-screen bitmap image data out of a storage medium that stores the on-screen bitmap image data, said on-screen bitmap image data representing an on-screen image, which has an amount of data less than that of reference bitmap image data representing the one frame of the image and which is superimposed on the image of interest represented by the image-of-interest data that has been input from said input device;

an adjustment device for adjusting the amount of the on-screen bitmap image data in such a manner that the size of the on-screen image represented by the on-screen bitmap image data that has been read by said reading device will take on said prescribed size equivalent to one frame of an image; and a device for applying on-screen processing to the image-of-interest data and the adjusted on-screen bitmap image data in such a manner that the on-screen image, which is represented by the on-screen bitmap image data that has been adjusted by said adjustment device, will be superimposed on the image of interest represented by the image-of-interest data that has been input from said input device.

2. An on screen device according to claim 1, wherein said on-screen image comprises an image captured by a user.

3. A method of controlling an on-screen device for an image of interest in a portable electronic device, comprising the steps of:

inputting image-of-interest data representing an image of interest having a prescribed size equivalent to one frame of an image;

reading on-screen bitmap image data out of a storage medium that stores the on-screen bitmap image data, the on-screen bitmap image data representing an on-screen image, which has an amount of data less than that of reference bitmap image data representing the one frame of the image and which is superimposed on the image of interest represented by the image-of-interest data that has been input;

adjusting the amount of data of the on-screen bitmap image data in such a manner that the size of the on-screen image represented by the read on-screen bitmap image data will take on the prescribed size equivalent to one frame of an image; and applying on-screen processing to the image-of-interest data and the adjusted on-screen bitmap image data in such a manner that the on-screen image, which is represented by the adjusted on-screen bitmap image data that has been adjusted, will be superimposed on the image of interest represented by the image-of-interest data that has been input.

4. A method according to claim 3, wherein said on-screen image is captured by a user.

5. A method according to claim 3, wherein adjusting the amount of data of the on-screen bitmap image data further includes reading pixel image data corresponding to a line of pixels from the on-screen bitmap image data twice.

6. A method according to claim 5, wherein adjusting the amount of data of the on-screen bitmap image data further includes calculating the arithmetic mean of the pixel image data read the second time and pixel image data corresponding to the pixel next in the line of pixels.

7. A method according to claim 5, wherein reading the line of pixels from the on-screen bitmap image data includes reading vertical pixels or horizontal pixels of the on-screen image.

8. An on-screen device for an image of interest in a portable electronic device, comprising:

an input device which inputs image-of-interest data representing an image of interest having a size equivalent of one frame of an image;

a reading device which reads on-screen bitmap image data from a storage medium, wherein said on-screen bitmap image data represents an on-screen image and has an amount of data less than reference bitmap image data representing the one frame of an image;

an adjustment circuit which reads pixel image data corresponding to a line of pixels from the on-screen bitmap image data twice and adjusts the amount of the on-screen bitmap image data to the size equivalent of the one frame of an image based on the pixel image data; and an on-screen processing circuit which superimposes the on-screen image onto the image-of-interest using the adjusted on-screen bitmap image data and the image-of-interest data.

9. A method of controlling an on-screen device for an image of interest in a portable electronic device, the method comprising:

inputting image-of-interest data representing an image of interest having a size equivalent of one frame of an image;

reading on-screen bitmap image data out of a storage medium, wherein the on-screen bitmap image data represents an on-screen image and has an amount of data less than that of reference bitmap image data representing the one frame of an image;

reading pixel image data corresponding to a line of pixels from the on-screen bitmap image data twice;

adjusting the amount of the on-screen bitmap image data to the size equivalent of the one frame of an image based on the pixel image data; and superimposing the adjusted on-screen image onto the image-of-interest of interest using the adjusted on-screen bitmap image data and the image-of-interest data.

10. A method according to claim 9, wherein adjusting the amount of on-screen bitmap image data comprises calculating the arithmetic mean of a second pixel image data read and pixel image data corresponding to a pixel next in the line of pixels.

11. A method according to claim 9, wherein reading the pixels includes reading vertical pixels or horizontal pixels of the on-screen image.

* * * * *